(12) United States Patent
Tyson (10) Patent No.: US 8,874,866 B1
(45) Date of Patent: Oct. 28, 2014

(54) MEMORY ACCESS SYSTEM (75) Inventor: James Tyson, Burnham Slough (GB)

(73) Assignee: Altera Corporation, San Jose, CA (US)

( * ) Notice: Subject to any disclaimer, the term of this patent is extended or adjusted under 35 U.S.C. 154(b) by 1314 days.

(21) Appl. No.: 12/693,288

(22) Filed: Jan. 25, 2010

(51) Int. Cl.
*G06F 12/00* (2006.01)
*G06F 17/30* (2006.01)
*G06F 12/14* (2006.01)

(52) U.S. Cl.
CPC ...... *G06F 12/1466* (2013.01); *G06F 17/30946* (2013.01)
USPC .................. 711/164; 711/E12.094; 707/741; 707/747; 707/E17.036

(58) Field of Classification Search
CPC .......... G06F 12/1466; G06F 17/30946; G06F 17/30949
USPC .................................. 711/164; 707/741, 747
See application file for complete search history.

(56) References Cited

U.S. PATENT DOCUMENTS

| | | | |
|---|---|---|---|
| 6,625,612 B1 * | 9/2003 | Tal et al. ............................... | 1/1 |
| 7,583,588 B2 * | 9/2009 | Bowes et al. ................. | 370/216 |
| 8,484,439 B1 * | 7/2013 | Frailong et al. ............... | 711/216 |
| 2008/0028138 A1 * | 1/2008 | Cypher .......................... | 711/108 |
| 2008/0235488 A1 * | 9/2008 | Ross ............................. | 711/216 |

\* cited by examiner

*Primary Examiner* — Aracelis Ruiz
(74) *Attorney, Agent, or Firm* — Mauriel Kapouytian Woods LLP; Ararat Kapouytian (57) ABSTRACT

Embodiments of the present invention provide methods of reading data from and writing data to a memory, computer program products for performing such methods, and apparatus for reading data from and writing data to, a memory, which apparatus may be implemented, for example, as a Field Programmable Gate Array (FPGA). A key associated with data to be read from or written to the memory is converted into two separate values, which values are themselves converted into first and second index values, each having an associated signature value. The index values are used as indices to a signature table containing a signature value for each data entry stored in the memory from which data is to be read or to which data is to be written. In a read operation, a signature of the signature table which matches one of the signature values derived from the key is identified and a read address is calculated based on the index value associated with the matching signature value derived from the key. In a write operation, a signature value is written to the signature table at an address corresponding to one of the index values derived from the key, and a write address is calculated based on that index value.

36 Claims, 7 Drawing Sheets

MEMORY ACCESS SYSTEM

BACKGROUND

The present invention relates to a method of reading data from, and writing data to, a memory, to a corresponding computer program product and to apparatus for reading data from, and writing data to, a memory, which apparatus may be implemented, for example, as a Field Programmable Gate Array (FPGA).

Many different devices use memory to store data. Typically, the memory used to store the data is random access memory (RAM), whose contents are accessed by specifying a memory address to read from or write to, with data subsequently being read from or written to that address. Retrieving a piece of data from RAM can be slow if the memory address at which the piece of data is stored is unknown, as the whole of the memory must be searched to retrieve the desired piece of data. Thus, RAM is unsuitable for certain devices in which data must be accessed quickly, for example computer networking devices such as routers.

In order to address this problem, content addressable memories (CAMs) have been developed. In a CAM a desired piece of data is supplied and the CAM searches its entire memory, returning a list of memory addresses at which the desired piece of data is located. This addresses the issue of slow access speed, as every instance of the desired piece of data can be identified in a single operation. However, CAMs are expensive and tend to be physically larger and have higher power consumption than RAMs of equivalent storage capacity.

Thus, a need exists for an inexpensive and physically small system which is able to read stored data from a memory quickly, and to write data to a memory quickly.

SUMMARY

An embodiment of a first aspect of the invention provides a method of reading data from a memory, the method including: generating a key associated with the data to be read from the memory; converting the key into a first index value and an associated first signature value; converting the key into a second index value and an associated second signature value; using the first and second index values to access a signature table containing a signature value for each entry stored in the memory to be read; identifying from the signature table entries accessed a signature which matches the first signature value or the second signature value; calculating, using the index value associated with the signature value so identified, an address in a result table of the memory; comparing a key stored in the result table at the address so calculated to the key generated; and, if the stored key matches the generated key, reading the data from the memory address so calculated.

Using an embodiment of the method of the present invention, a maximum of two memory read operations are required to retrieve the desired data, as there can only ever be a maximum of two entries in the signature table which relate to the desired data in the results table. Thus, an embodiment of the method reduces the number of memory access operations required to retrieve desired data in comparison to known RAM based memory access systems, whilst avoiding the financial cost and physical size disadvantages associated with CAMs.

In one embodiment, converting the key into the first index value and the associated first signature value may include performing a first hash function on the key, and converting the key into the second index value and the associated second signature value may include performing a second hash function on the key, which second hash function is different from the first hash function.

The address in the result table may be calculated based on the index value associated with the identified signature value and on a position within the signature table of the identified signature value.

The signature table may be provided in a dual port RAM.

Similarly, the result table may be provided in a dual port RAM.

An embodiment of a second aspect of the invention provides a method of writing data to a memory, the method including: generating a key associated with the data to be written to the memory; converting the key into a first index value and an associated first signature value; converting the key into a second index value and an associated second signature value; using the first and second index values to access a signature table containing a signature value for each entry stored in the memory to which the data is to be written; identifying a location in the signature table; writing the first or second signature value to the location so identified; calculating, using the index value associated with the signature value no written, an address in a result table of the memory to which the data can be written; and writing the data to the address so calculated.

The method may further include removing a signature value stored at the identified location in the signature table and removing an entry in the result table corresponding to the removed signature value if the identified location is not vacant.

The removed signature value and the removed result table entry may be stored in memory.

The stored signature value may be written to an alternative location in the signature table and the stored result table entry may be written to a corresponding alternative address in the result table.

In one embodiment, converting the key into the first index value and the associated first signature value may include performing a first hash function on the key, and converting the key into the second index value and the associated second signature value may include performing a second hash function on the key, which second hash function is different from the first hash function.

The address in the result table may be calculated based on the index value associated with the identified signature value and on a position within the signature table of the identified signature value.

The signature table may be provided in a dual port RAM.

Similarly, the result table may be provided in a dual port RAM.

An embodiment of a third aspect of the invention provides a data carrier containing instructions for causing data processing equipment to perform a method according to embodiments of the first or second aspects of the invention.

An embodiment of a fourth aspect of the invention provides apparatus for reading data from a memory, the apparatus including a processor having an input for receiving a key associated with the data to be read from the memory, the processor being configured to: convert the key into a first index value and an associated first signature value; convert the key into a second index value and an associated second signature value; use the first and second index values to access a signature table containing a signature value for each entry stored in the memory to be read; identify from the signature table entries so accessed a signature which matches the first signature value or the second signature value; calculate, using the index value associated with the signature value so identified, an address in a result table of the memory; compare a key stored in the result table at the address so calculated to the key generated; and, if the stored key matches the generated key, reading the data from the memory address so calculated.

The processor may be configured to perform a first hash function on the key to convert the key into the first index value and the corresponding first signature value, and to perform a second hash function on the key to convert the key into the second index value and the corresponding second signature value, which second hash function is different from the first hash function.

The processor may be configured to calculate the address in the result table based on the index value associated with the identified signature value and on a position within the signature table of the identified signature value.

The signature table may be provided in a dual port RAM.

Similarly, the result table may be provided in a dual port RAM.

The processor may be configured to operate in a pipelined fashion.

The apparatus may further include a secondary lookup circuit having a memory for temporary storage of signature table and result table entries.

The apparatus may further include a parallel circuit having a memory for storing keys and associated data.

An embodiment of a fifth aspect of the invention provides apparatus for writing data to a memory, the apparatus including a processor having an input for receiving a key associated with the data to be written to the memory, the processor being configured to: generate a key associated with the data to be written to the memory; convert the key into a first index value and an associated first signature value; convert the key into a second index value and an associated second signature value; use the first and second index values to access a signature table containing a signature value for each entry stored in the memory to which the data is to be written; identify a location in the signature table; write the first or second signature value to the location so identified; calculate, using the index value associated with the signature value so written, an address in a result table of the memory to which the data can be written; and write the data to the address so calculated.

The processor may be further configured to remove a signature value stored at the identified location in the signature table and to remove an entry in the result table corresponding to the removed signature value if the identified location in the signature table is not vacant.

The processor may be further configured to store the removed signature value and the removed result table entry in memory.

The processor may be further configured to write the stored signature value to an alternative location in the signature table and to write the stored result table entry to a corresponding alternative address in the result table.

The processor may be further configured to perform a first hash function on the key to convert the key into the first index value and the associated first signature value, and to perform a second hash function on the key to convert the key into the second index value and the associated second signature value, which second hash function is different from the first hash function.

The processor may be configured to calculate the address in the result table based on the index value associated with the identified signature value and on a position within the signature table of the identified signature value.

The signature table may be provided in a dual port RAM.

Similarly, the result table may be provided in a dual port RAM.

The processor may be configured to operate in a pipelined fashion.

The apparatus may further including a secondary lookup circuit having a memory for temporary storage of signature table and result table entries.

The apparatus may further include a parallel circuit having a memory for storing keys and associated data.

An embodiment of a sixth aspect of the invention provides an FPGA implementing an apparatus according to embodiments of the fourth or fifth aspects of the invention.

BRIEF DESCRIPTION OF THE DRAWINGS

The novel features of the invention are set forth in the appended claims. However, for purpose of explanation, several aspects of particular embodiments of the invention are described by reference to the following figures:

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
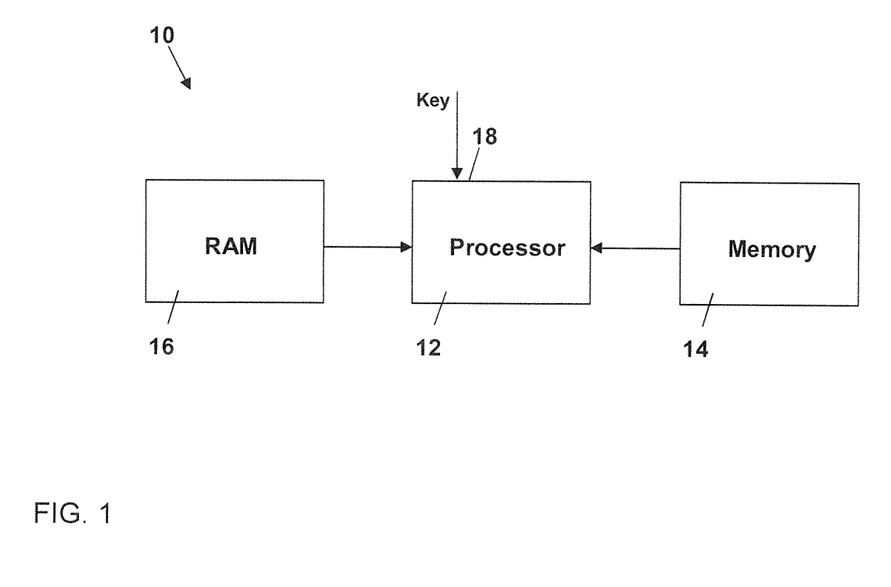
FIG. 1 is a schematic diagram illustrating a processing system for reading data from a memory or for writing data to the memory.

Referring first to FIG. 1, a processing system for reading data from a memory, or writing data to the memory, is shown generally at 10. The processing system 10 includes a processor 12, which may be for example a processing element of a field programmable gate array (FPGA), and a memory 14, which may be part of the processor 12 or may be external to the processor 12, in which data to be accessed can be stored. The processing system 10 includes a further RAM 16, which may be provided as part of the processor 12, or may be provided as an external RAM 16, as is shown in the exemplary system of FIG. 1.

The processing system 10 implements methods for reading data from, or writing data to, the memory 14, and can be used in systems such as IP routers and switches where high speed data access is required.

The processor 12 has an input 18 through which an externally-generated key related to or associated with the data to be read from or written to the memory 14 can be input to the processor 12. Alternatively, the key may be generated by the processor 12 from data input to the processor 12 through the input 18. The key may be, for example, an IP address, where the processing system 10 forms part of an IP router or switch.

Figure 2:
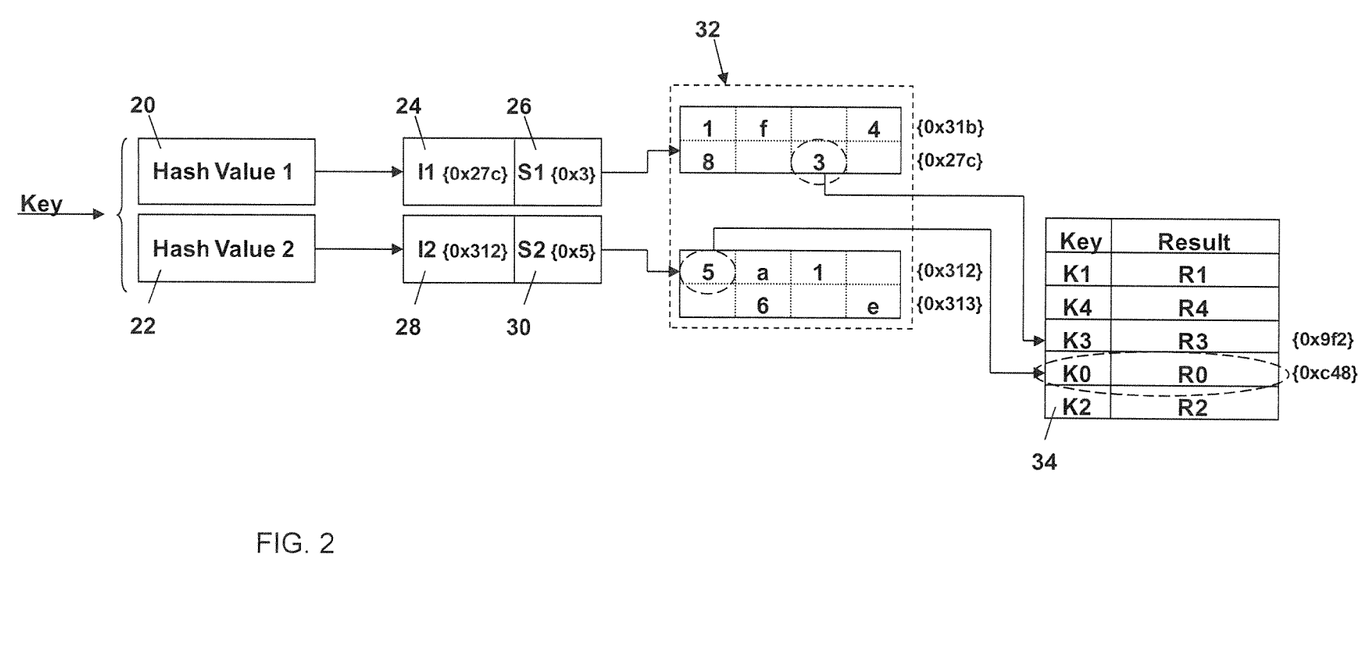
FIG. 2 is a schematic diagram illustrating a method for performing a read operation to read data from a memory.

A method for performing a read operation to read data from the memory 16 is illustrated schematically in FIG. 2. In this method, the processor 12 is configured or programmed to convert the key into a pair of indices with associated signatures, which indices and signatures act as a compressed representation of the key. In one embodiment, during the conversion process, the processor 12 first performs first and second separate hash functions in parallel, the second hash function being different from the first hash function, on the key to generate respective first and second hash values 20, 22, which may be, for example, 32 bit numbers. Any suitable hash function may be used to generate the first and second hash values 20, 22. For example, a CRC32, CRC32C, FNV, Jenkins, Murmur or Toeplitz hash function may be used, although it will be appreciated by those skilled in the art that many other hash functions, or indeed other mathematical functions which produce a single output for a given input, are equally suitable. It will be appreciated that more than two hash functions or other mathematical functions may be performed so as to generate more than two hash values, and that the invention is not limited to the use of two hash or other functions.

The first hash value 20 is converted by the processor 12 into a first index value 24 and an associated first signature value 26, whilst the second hash value 22 is converted into a second index value 28 and an associated second signature value 30. The first and second index values 24, 28 and the first and second signature 26, 30 values may be calculated in a variety of ways. For example, the first and second index values 24, 28 may be made up of the first (most significant) 16 bits of each of the first and second hash values 20, 22 respectively, whilst the final (least significant) six bits of each of the first and second hash values 20, 22 may form the first and second signature values 26, 30 respectively. Of course, this is only one example of how the index values 24, 28 and the signature values 26, 30 may be calculated, and it will be appreciated that different methods may be used to calculate the index values 24, 28 and the signature values 26, 30.

The first and second index values 24, 28 are used to index a signature table 32, which is look-up table stored in the RAM 16 of the processing system 10, and which contains signature values for all of the data entries that have been entered into the memory 14. A plurality of signature values can be stored at each memory address of the signature table 32. In the example shown in FIG. 2, each memory address has four memory locations, and thus four signature values can be stored at each memory address, as is indicated by the boxes shown in dotted outline in the signature table 32 of FIG. 2. Each memory location of each memory address has an associated flag, which is set when a signature value is stored at that location, and is clear when that memory location is empty. Thus, the processing system 10 is able to ascertain whether a signature value is present at a particular location at an address in the signature table 32.

The processor 12 compares the first and second signature values 26, 30 derived from the first and second hash values 20, 22 to the signature values stored in the signature table 32. Where a signature value stored in the signature table 32 matches one or both of the first and second signature values 26, 30 derived from the first and second hash values 20, 22, the associated index value 24, 28 (which was used as an index to the address in the signature table 32 at which the matching signature value(s) 26, 30 are located) is stored by the processor 12 and used, with the memory location within the address of the signature table of the matching signature value 26, 30, to calculate an address in a result table 34 at which the required data is located. Thus, if both of the signature values 26, 30 have matching signature values in the signature table 32, two possible result table 34 addresses are calculated by the processor 12.

The result table 34 is a further look-up table stored in the RAM 16 of the processing system 10 and which contains the data to be retrieved, for example a destination MAC address in an IP routing application. Data is stored in the result table 34 as a result (e.g., the destination MAC address) and an associated key. One result and its associated key can be stored at each memory address in the result table 34. The result table 34 may be stored in a single physical memory, in which case the data stored contains both the key and the result. Alternatively, the result table 34 could be stored in two separate memories, one of which contains the keys, the other containing the associated results.

Once the possible address(es) of the desired data have been determined from the index value 24, 28 and the corresponding signature value 26, 30, the result table 34 can be accessed by the processing system 10 to retrieve the result data and the associated key from the first address so determined. The key retrieved from the result table 34 is compared to the original key input to the processor 12. If the retrieved key matches the original key, the associated result data is returned by the processor 12 as the output of the read operation. If the retrieved key does not match the original key, the second possible result table 34 address calculated by the processor 12 is read, if such a second possible result table 34 address was calculated, and the retrieved key is compared to the original key. If this retrieved key matches the original key, the associated result data is returned by the processor 12 as the output of the read operation. If the second retrieved key does not match the original key, or if no second possible result table 34 address was calculated by the processor 12, the processor 12 returns a "no match" indication as the output of the read operation.

To aid in the comprehension of the operation of the processing system 10 in performing a read operation, an example will now be provided, with reference to FIG. 2.

A key having a value K0 is input into the processor 12 via the input 18 (see FIG. 1). The key is converted by the processor 12 using two separate hash functions into separate first and second separate hash values, shown at 20 and 22 respectively in FIG. 2. The first and second hash values 20, 22 are converted by the processor 12 into a first index value 24, which in this example has a value of 0x27c, and an associated first signature value 26, which in this example has a value of 0x3. Similarly, the second hash value is converted into a second index value 28, having in this example a value of 0x312, and an associated second signature value, which in this example has a value of 0x5.

The processor 12 uses the first and second index values 24, 28 as indices to the signature table 32. Thus, in this example, the processor 12 reads the entries at addresses 0x27c and 0x312 in the result table 32, to identify signature values stored at those addresses which match the first and second signature values 26, 30 derived from the key K0. In this example, the signature value 0x3, which matches the first signature value 26, appears in the memory location 2 position of the signature table entry at address 0x27c. Thus, the processor 12 stores the index value 0x27c and the position 2, and uses these values to determine an address in the result table 34 from which desired result data may be read. Similarly, the signature value 0x5, which matches the second signature value 30, appears in the memory location 0 position of the entry at memory address 0x312. Thus, the index value 0x312 and the position 0 are stored by the processor 12 and used to determine an address in the result table 34 from which desired results data may be read.

In this example, the processor 12 calculates the address in the result table 34 by multiplying the index value by four and adding the memory location to the result of the multiplication. Thus, in this example the processor 12 calculates a first result table address of (4x0x27c)+2=0x9f2 and a second result table address of (4x0x312)+0=0xc48. It will be appreciated, however, that the method of calculating the read address in the result table 34 will depend on the method used to determine the address at which results and their associated keys are stored during a write operation, and that many different methods are suitable.

The key and results data stored at these addresses in the result table 34 are read by the processor 12, and the keys are compared to the original key input into the processor 12. In this example, address 0x9f2 of the result table 34 contains a key K3, which does not match the original key K0 input into the processor 12. Thus, the result R3 which is stored at this address in the result table 34 is not the desired data. However, the key stored at address 0xc48 in the result table 34 does match the key K0 originally input into the processor 12. Thus, the result R0 which is stored at this address in the result table 34 is the desired data, and this is returned by the processing system 10 as the result of the read operation.

It will be noted that as a result of the use of first and second separate and different hash functions to determine the first and second hash values 20, 22 from the key there can only be a maximum of two addresses in the result table 34 from which desired result data can be read. It will be appreciated that reading from a maximum of two memory addresses in the result table 34 is considerably faster than reading each address in turn to locate desired data. Of course, if fewer than two entries in the signature table 32 correspond to the first or second signature values 20, 22 fewer than two addresses in the result table 34 may be read by the processor 12.

The signature table 32 can be implemented using a single port RAM or a dual port RAM. If a dual port RAM is used, two locations can be accessed simultaneously, thus permitting two addresses (identified by the first and second index values 24, 28) to be read at the same time, thus further improving memory access speed. Similarly, the result table 34 can be implemented using a single port RAM or a dual port RAM, and if a dual port RAM is used, two addresses in the result table 34 can be read simultaneously.

Figure 3:
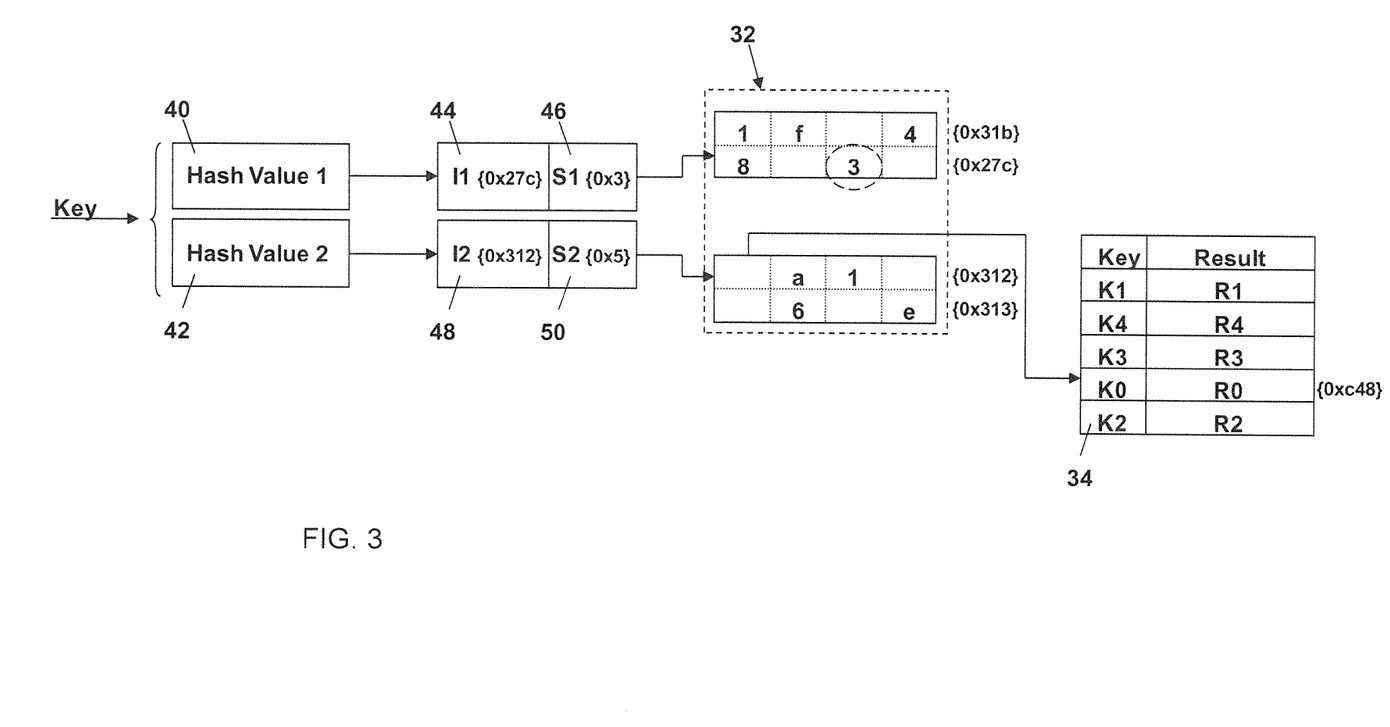
FIG. 3 is a schematic diagram illustrating a method for performing a write operation to write data to a memory.

A method for performing a write operation to write data to the memory 14 is illustrated schematically in FIG. 3. In the write operation, first a key related to or associated with the data to be written to the memory 14 is input to the processor 12 via the input 18. The processor 12 is configured or programmed to convert the key into a pair of indices with corresponding signatures, which indices and signatures act as a compressed representation of the key. In one embodiment, during the conversion process, the processor 12 first performs first and second separate hash functions in parallel, the second hash function being different from the first hash function, on the key to generate first and second hash values 40, 42, which may be, for example, 32 bit numbers. Any suitable hash function may be used to generate the first and second hash values 40, 42. For example, a CRC32, CRC32C, FNV, Jenkins, Murmur or Toeplitz hash function may be used, although it will be appreciated by those skilled in the art that many other hash functions, or indeed other mathematical functions which produce a single output for a given input, are equally suitable.

The first hash value 40 is converted by the processor 12 into a first index value 44 and an associated first signature value 46, whilst the second hash value 42 is converted into a second index value 48 and an associated second signature value 50. The first and second index values 44, 48 and the first and second signature values 46, 50 may be calculated in a variety of ways. For example, the first and second index values 44, 48 may be made up of the first (most significant) 24 bits of each of the first and second hash values 40, 42, whilst the final (least significant) eight bits of each of the first and second hash values 40, 42 may form the first and second signature values 46, 50.

The processor 12 examines the contents of the signature table 32 at addresses corresponding to the first and second index values 44, 48 so generated to establish whether the signature table 32 is able to accommodate a new signature entry at one or both of those addresses. If the signature table 32 is able to accommodate a new signature entry at one of the addresses, the signature value 46, 50 associated with the index value 44, 48 which corresponds to the available signature table 32 address is stored in the signature table 32 at that address. It is to be noted that only one of the signature values 46, 50 is stored in the signature table 32. If the signature table 32 is able to accommodate both of the signature values 46, 50, one of the signature values 46, 50 is selected at random, or in accordance with predefined rules, to be stored in the signature table 32. In the event that the signature table 32 is unable to accommodate a new signature entry at either of the addresses corresponding to the index values 44, 48 generated by the processor 12, a conflict procedure must be instigated, as will be explained in more detail below.

If a signature has been added to the signature table 32, the processor 12 calculates, from the index value 44, 48 and the associated signature value 46, 50, an address at which the key originally input to the processor 12 and its associated result (e.g., a destination MAC address in an IP routing application) can be stored in the result table 34, and stores the key and its associated result at the address so calculated in the result table 34.

To aid in the comprehension of the operation of the processing system 10 in performing a write operation, an example will now be provided, with reference to FIG. 3.

A key having a value K0, which key is associated with result data such as a destination MAC address, is input into the processor 12 by means of the input 18. The key is converted by the processor 12 using two separate hash functions into separate first and second hash values 40, 42. The first and second hash values 40, 42 are converted by the processor 12 into a first index value 44, which in the example shown in FIG. 3 has a value of 0x27c, and an associated first signature value 46, which in this example has a value of 0x3. Similarly, the second hash value is converted by the processor 12 into a second index value 48, having in this example a value of 0x312, and an associated second signature value 50, which in this example has a value of 0x5.

The processor 12 examines the contents of the signature table 32 at the addresses corresponding to the first and second index values 44, 48. In this example, the signature table 32 contains a signature value of 3 in the memory location 2 position at the address 0x27c corresponding to the first index value 44, as is indicated by the dashed ring in FIG. 3. Thus, the first signature value 46, which has a value of 0x3, cannot be stored at address 0x27c in the signature table 32, as it would conflict with the existing signature table entry. However, there is no signature table entry having a signature value of 5 (corresponding to the second signature value 50, of 0x5) at the signature table address 0x312, which corresponds to the second index value 48. Thus, the second signature value 50, whose value is 0x5, can be stored in the signature table 32 at address 0x312. The processor 12 writes the second signature value 50 to an available memory location in this address of the signature table 32. From this memory location and the second index value 48 the processor 12 calculates an address in the result table 34 at which the key originally provided to the processor 12 and the associated result data can be stored. In this example, the processor 12 selects memory location 3 at address 0x312 of the result table 32 to store the second signature value 50. The processor calculates a result table address of (4x0x312)+3=0xc48 as the address in the result table 34 at which to store the key K0 and its associated results data, and writes the key K0 and its associated results data to that address in the result table.

In certain circumstances the signature table 32 is not able to accommodate a new signature value 46, 50 at the addresses determined by the first and second index values 44, 48. In these circumstances, the processor 12 may move data in the result table 34, and effect a corresponding movement of a signature in the signature table 32 such that the new signature value 46, 50 can be accommodated at the address in the signature table 32 defined by the associated first or second index value 44, 48. This situation is explained below with reference to FIGS. 4 and 5.

Figure 4:
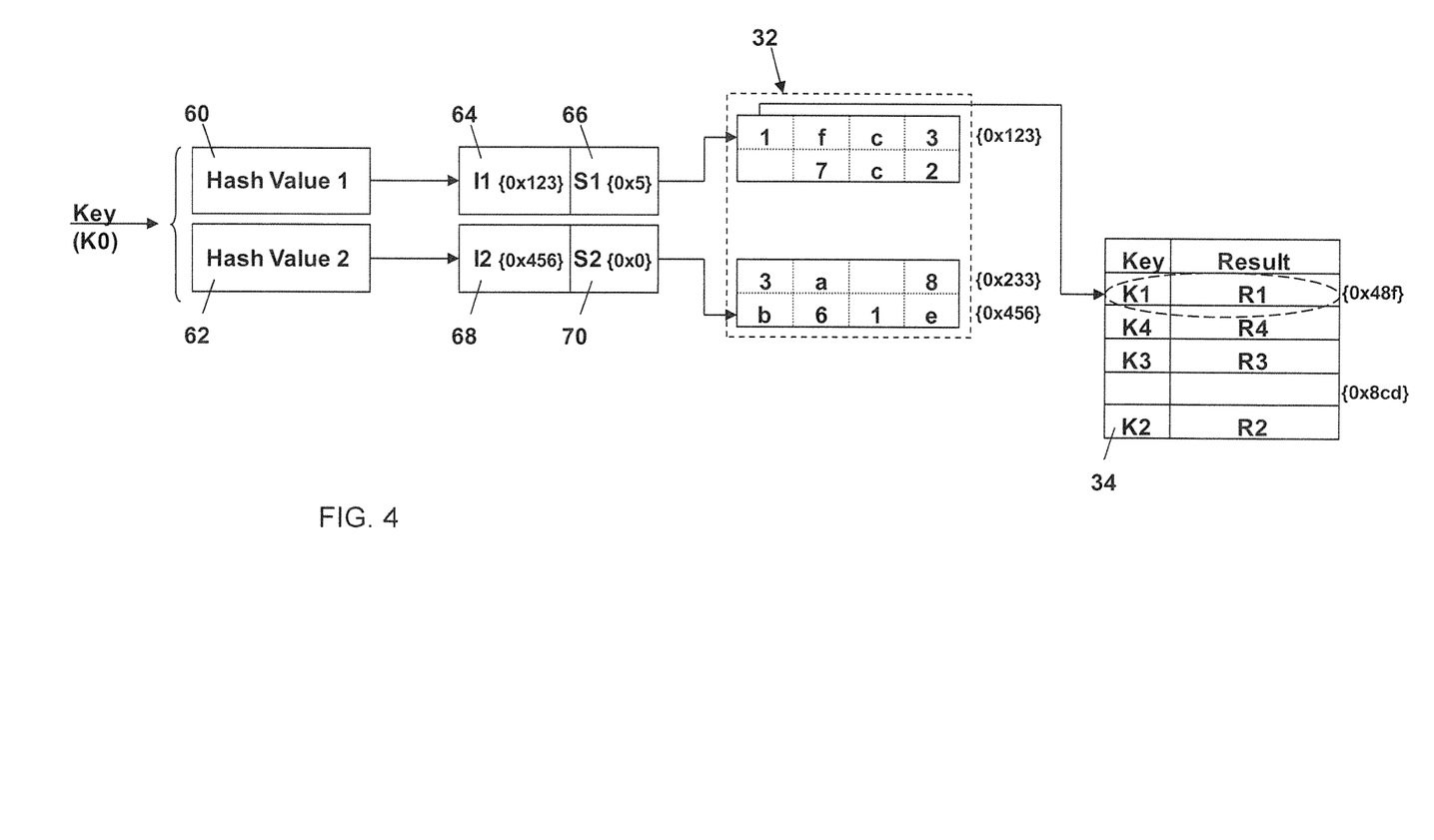
FIG. 4 is a schematic diagram illustrating an example of a situation in which data to be written to a memory conflicts with data which has previously been written to the memory.

In FIG. 4, a key with a value K0 is converted by the processor 12 using two separate hash functions into first and second hash values 60, 62. The processor 12 converts the first hash value 62 into a first index value 64, having in this example a value of 0x123, and an associated first signature value, which in this example has a value of 0x5. Similarly, the processor 12 converts the second hash value 62 into a second index value 68, having in this example a value of 0x456, and an associated second signature value, which in this example has a value of 0x0.

The processor 12 examines the signature table 32 at the addresses corresponding to the first and second index values 64, 68. The address 0x123 in the signature table 32, which corresponds to the first index value 64, contains four signature value entries, and thus cannot accommodate the first signature value 68. Similarly, the address 0x456 in the signature table 32, which corresponds to the second index value 68, contains four signature values, and thus cannot accommodate the second signature value 70.

In order to resolve this conflict in the signature table 32 and allow the signature value 66, 70 to be stored in the signature table 32 and thus to permit the key K0 and its associated result to be stored in the result table 34, the processor 12 removes one of the signature entries in the signature table 32 from one of the addresses corresponding to the first or second index values 64, 68. The processor 12 may select a signature value to remove at random, or may follow predefined rules in selecting a signature value to remove from the signature table 32. The processor 12 also removes the entry in the result table 34 corresponding to the signature value removed from the signature table 32. The signature value removed from the signature table 32 and the corresponding entry removed from the result table are stored by the processor 12 in local memory (which may be implemented as one or more registers, for example) such that they can be re-written to the signature table 32 and the result table 34 respectively, once the key K0 and its associated result have been written to the result table 34 and the corresponding signature has been written to the signature table 32.

In the example illustrated in FIG. 4, the processor 12 selects the signature table entry at memory location 0 at address 0x123 to be replaced by the first signature value 64. Thus, the signature value 0x1 is removed from this position and stored in local memory by the processor 12. The processor 12 calculates the address of the entry in the result table 34 which holds the key corresponding to the removed signature value in the manner described above. In this example, the key has a value of K1 and an associated result R1, and these are stored at address 0x48f. The key K1 and the associated result R1 are removed from the result table 34 by the processor 12 and stored in local memory so that they can later be re-written to a different address in the result table 34.

Figure 5:
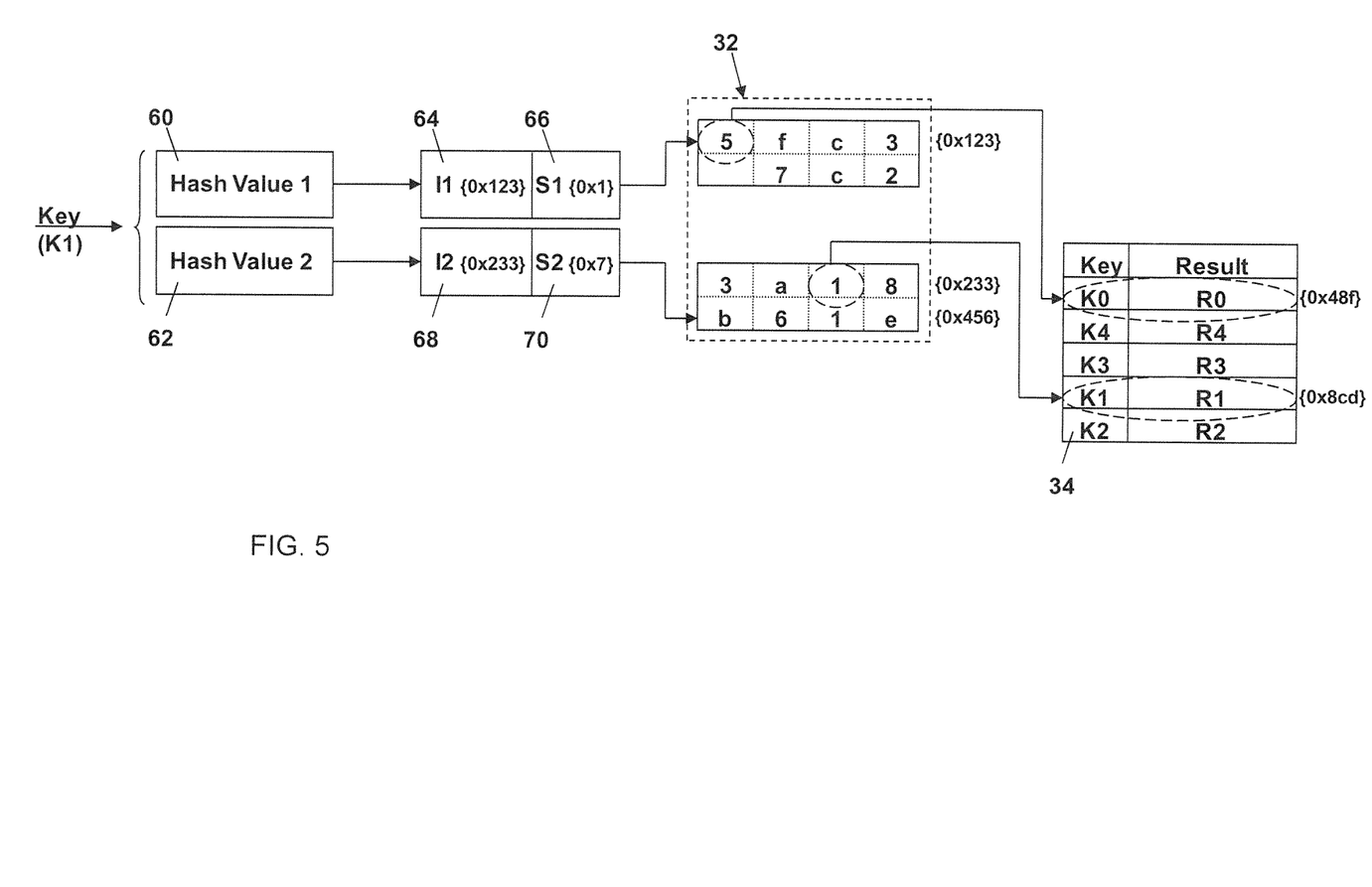
FIG. 5 is a schematic diagram illustrating an example of data being re-written to a memory after being removed to accommodate new data.

The processor 12 then writes the first signature value 64 (which in this example has a value of 0x5) to the now-vacant memory location 0 position of address 0x123 in the signature table. The corresponding key and its associated result are written by the processor 12 to the now-vacant address 0x48f in the result table, as is shown in FIG. 5.

From FIG. 4 it will be apparent that there is a free slot for a signature value at the memory location 2 position at address 0x233 in the signature table 32. Thus, the processor writes the removed signature value 0x1 to the memory location 2 position at address 0x233 in the signature table 32. The processor 12 then calculate the address in the result table corresponding to the vacant signature table position (which address is, in this example, 0x8cd) and writes the removed key K1 and its associated result to the address in the result table 34 so calculated. In this manner, the new key K0 and its associated result are safely stored in the result table 34 and can be accessed correctly using the read operation described above. The signature value 0x1 has been moved to an address in the signature table 32 from which the processor 12 can calculate the new address in the result table 34 of the key K1. Thus, all of the data in the result table 34 can be correctly accessed using a read operation as described above.

In the event that there is a conflict when writing the removed signature value to a new address in the signature table 32, in that the new address is full and thus unable to accommodate the removed signature value, the process described above is repeated. Thus, a signature value is removed from the signature table 32 at the new address and the corresponding key value and its associated result are removed from the result table 34. The first removed signature value is written to the now-vacant signature table address and the corresponding key and its associate result are written to the now-vacant result table address, which is calculated by the processor 12 on the basis of the new signature table 32 address and the memory location to which the first removed signature value is written. The second removed signature value is written to a vacant position in the signature table 32 and the second removed key and its associated result are written to the corresponding address in the result table 34.

To provide a fail-safe mechanism in case of failure to re-write removed signature table 32 and result table 34 entries, the processor 12 may include a local memory (which forms part of block 92 of FIG. 6) in which a number of removed signature table 32 and result table 34 entries can be stored temporarily. This memory may be accessed by the processor 12 during a read operation in the event that a valid signature value that is calculated by the corresponding result table entry is empty or contains an incorrect key. Thus, a failed re-write operation is not disruptive to the operation of the processing system 10. A fresh write operation can be performed after the failed re-write operation to write the temporarily stored signature table 32 and result table 34 entries from the local memory to the signature table 32 and the result table 34, respectively.

A further local memory may be provided (as part of block 102 of FIG. 6) for locally storing keys and data while they are being inserted into the result table 34 or moved within the result table 34. This local storage of result table 34 entries also ensures that a read operation which occurs between the removal of a key and its associated result from the result table 34 and the subsequent re-writing of the key and the associated result to an alternative address in the result table 34 is not disrupted, as the removed key and its associated result can be retrieved from the further local memory.

The processing system 10 can be implemented in a pipelined fashion to optimise data throughput. An exemplary pipelined implementation of the processing system 10 is illustrated generally at 80 in FIG. 6, showing a read operation.

Figure 6:
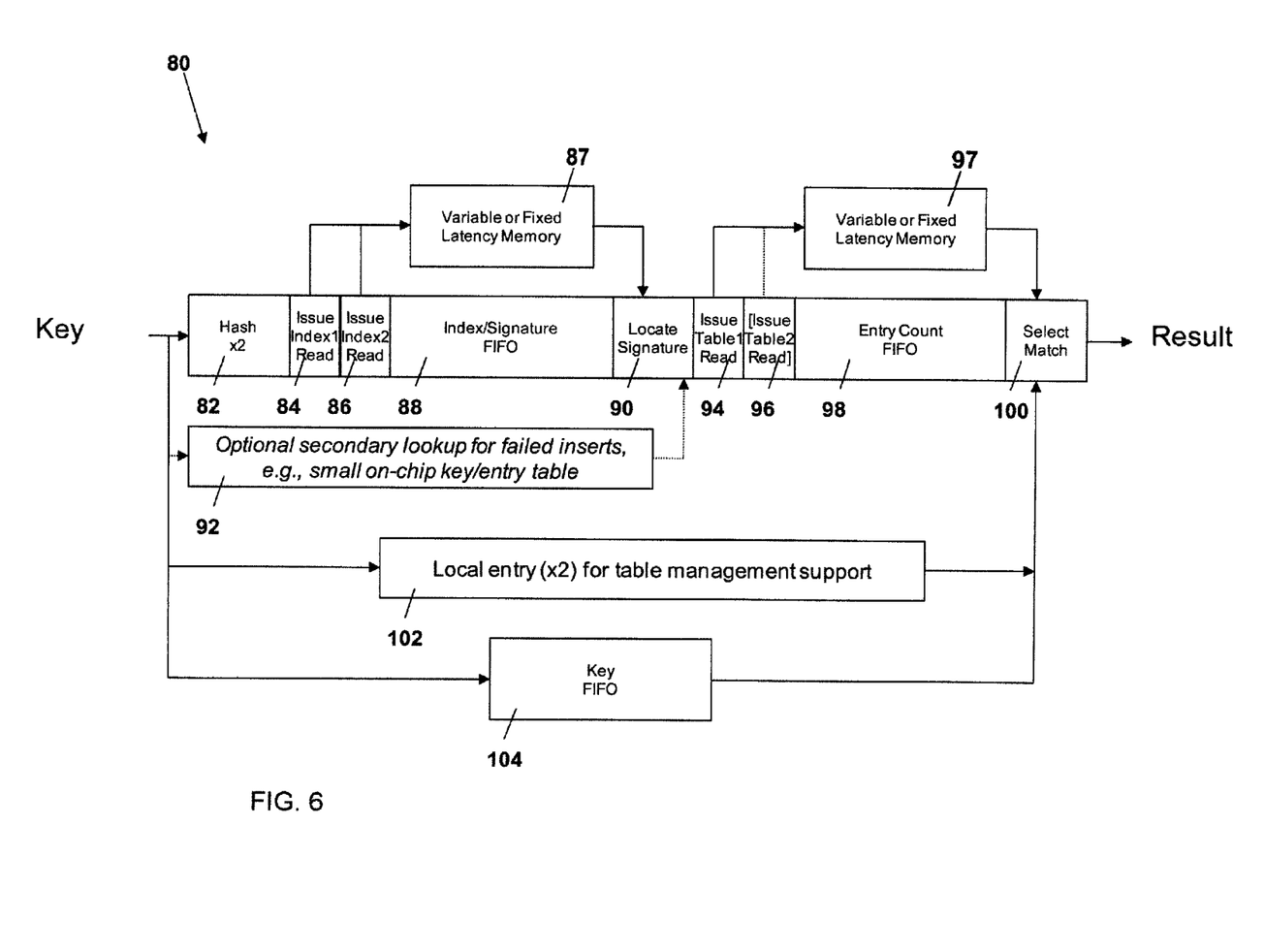
FIG. 6 is a schematic illustration of a pipelined implementation of a processing system.

In the implementation illustrated in FIG. 6 the key is input into the processor 12 and undergoes the two separate parallel hash operations at 82, to produce the first and second index and signature values. As is discussed above, in alternative implementations of the processing system 10, more than two hash (or other) operations may be performed by the processor 12 to generate more than two pairs of index and signature values.

Read commands are issued at 84 and 86, causing read operations to be performed to read the addresses of the variable or fixed latency memory 87 (i.e., the signature table 32 shown in FIG. 2) corresponding to the index values generated at 82. If the memory 87 is a dual-port memory, these read operations can be performed simultaneously, whereas for a single-port memory the read operations must be carried out sequentially. A first-in-first-out (FIFO) register 88 stores the index and signature values generated by the processor at 82 to permit matching of the index and signature values with a result returned by the read operations 84, 86.

At 90, the result is returned by the read operations 84, 86, which in this example will be either 0, 1 or 2 signature locations (each including a memory address equating to an index value and a memory location within that memory address These are converted into result table addresses at 90, which are subsequently used to read a fixed or variable latency memory 97 (i.e., the result table 34 shown in FIG. 2).

A secondary lookup circuit 92 may be provided so that a secondary read operation may occur in parallel with the signature table read operations of 82 to 90. This secondary read mechanism provides a fail-safe mechanism, by essentially duplicating the process detailed above using locally stored copies of the keys and their associated locations in the result table 34. In this way, the local copies of the result table addresses can be read, providing redundancy to ensure that data loss or corruption which may occur during re-write or move operations does not affect subsequent read operations.

At 94 and 96, read commands are issued to cause addresses calculated at 90 of the memory 97 containing the result table 34 to be read. Again, these read commands may be performed simultaneously if the memory 97 is a dual-port memory, or may be performed sequentially for a single-port memory. The memory table addresses are stored in a FIFO register 98 to permit matching of results of the read operation with the address(es) for which a read command was issued.

At 100, the results of the read operations 94, 96 are compared to the original key input into the processor 12, which key is stored in a FIFO register 104 to enable this matching to take place.

An optional parallel circuit 102 may provided as part of the processing system 10. This circuit 102 performs the same actions as the main path described above, using copies of keys and the associated results of read operations on the result table 34 which are stored locally in a memory or registers. When the key(s) retrieved from result table 34 are compared to the original key entered into the processor 12 at 100, the key(s) retrieved by the parallel circuit 102 are also compared to the original key, and if a match is found from the key(s) retrieved by the parallel circuit 102, the associated result may be returned in preference to the result returned by the main circuit, to ensure that the operation of the processing system 10 is not compromised by movement or deletion of result table entries which may occur between or during read operations.

It will be appreciated that this pipelined implementation of the processing system 10 permits efficient processing of read operations, allowing one result to be obtained per clock cycle. As will be appreciated, a similar approach can be applied to write operations.

Figure 7:
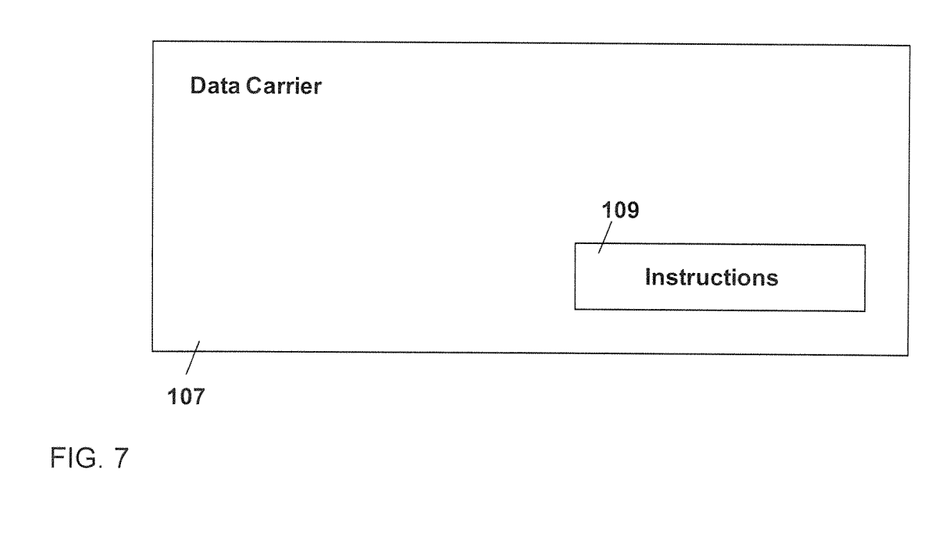
FIG. 7 illustrates a block diagram of a data carrier containing instructions for performing embodiments of methods of the present invention.

It will be appreciated that while the processing system 10 has been described above in terms of functional blocks, it could be implemented in a variety of ways, for example as a circuit made up of discrete electronic components, in a suitably programmed processor or FPGA, or as a computer program stored on an appropriate carrier such that when executed the computer program causes a computer to perform the method described above. FIG. 7 illustrates a block diagram of a data carrier 107 (e.g., a memory device) containing instructions 109 (e.g., computer program instructions) for performing embodiments of methods of the present invention. In one embodiment, the instructions 109 are for causing a processing system to perform embodiments of the methods of the present invention. The data carrier 107 may be any suitable medium that may contain such instructions.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of reading data from a memory, the method comprising:

generating a key associated with the data to be read from the memory;

converting the key into a first index value and an associated first signature value;

converting the key into a second index value and an associated second signature value;

using the first and second index values to access a signature table containing a signature value for each entry stored in the memory to be read;

identifying from the signature table entries accessed a signature which matches the first signature value or the second signature value;

calculating, using the index value associated with the signature value identified, an address in a result table of the memory;

comparing a key stored in the result table at the address calculated to the key generated; and, if the stored key matches the generated key, reading the data from the memory address calculated.

2. A method according to claim 1, wherein the converting the key into the first index value and the associated first signature value comprises performing a first hash function on the key, and the converting the key into the second index value and the associated second signature value comprises performing a second hash function on the key, wherein the second hash function is different from the first hash function.

3. A method according to claim 1, wherein the address in the result table is calculated based on the index value associated with the identified signature value and on a position within the signature table of the identified signature value.

4. A method according to claim 1, wherein the signature table is provided in a dual port RAM.

5. A method according to claim 1, wherein the result table is provided in a dual port RAM.

6. A method of writing data to a memory, the method comprising:
  generating a key associated with the data to be written to the memory;
  converting the key into a first index value and an associated first signature value;
  converting the key into a second index value and an associated second signature value;
  using the first and second index values to access a signature table containing a signature value for each entry stored in the memory to which the data is to be written;
  identifying a location in the signature table to which the first or second signature value can be written;
  writing the first or second signature value to the location identified;
  calculating, using the index value associated with the signature value written, an address in a result table of the memory to which the data can be written; and
  writing the data to the address calculated.

7. A method according to claim 6 further comprising removing a signature value stored at the identified location in the signature table and removing an entry in the result table corresponding to the removed signature value if the identified location is not vacant.

8. A method according to claim 7, wherein the removed signature value and the removed result table entry are stored in memory.

9. A method according to claim 8, wherein the stored signature value is written to an alternative location in the signature table and the stored result table entry is written to a corresponding alternative address in the result table.

10. A method according to claim 6, wherein the converting the key into the first index value and the associated first signature value comprises performing a first hash function on the key, and the converting the key into the second index value and the associated second signature value comprises performing a second hash function on the key, wherein the second hash function is different from the first hash function.

11. A method according to claim 6, wherein the address in the result table is calculated based on the index value associated with the identified signature value and on a position within the signature table of the identified signature value.

12. A method according to claim 6, wherein the signature table is provided in a dual port RAM.

13. A method according to claim 6, wherein the result table is provided in a dual port RAM.

14. A non-transitory data carrier containing instructions for causing data processing equipment to perform a method according to claim 1.

15. A non-transitory data carrier containing instructions for causing data processing apparatus to perform a method according to claim 6.

16. Apparatus for reading data from a memory, the apparatus comprising a processor having an input for receiving a key associated with the data to be read from the memory, wherein the processor:
  converts the key into a first index value and an associated first signature value;
  converts the key into a second index value and an associated second signature value;
  uses the first and second index values to access a signature table containing a signature value for each entry stored in the memory to be read;
  identifies from the signature table entries accessed a signature which matches the first signature value or the second signature value;
  calculates, using the index value associated with the signature value identified, an address in a result table of the memory;
  compares a key stored in the result table at the address calculated to the key; and, if the stored key matches the key, reads the data from the memory address calculated.

17. Apparatus according to claim 16, wherein the processor further performs a first hash function on the key and performs a second hash function on the key, wherein the second hash function is different from the first hash function.

18. Apparatus according to claim 16, wherein the processor calculates the address in the result table based on the index value associated with the identified signature value and on a position within the signature table of the identified signature value.

19. Apparatus according to claim 16, wherein the signature table is provided in a dual port RAM.

20. Apparatus according to claim 16, wherein the result table is provided in a dual port RAM.

21. Apparatus according to claim 16, wherein the processor operates in a pipelined fashion.

22. Apparatus according to claim 16 further comprising a secondary lookup circuit having a memory for temporary storage of signature table and result table entries.

23. Apparatus according to claim 16 further comprising a parallel circuit having a memory for storing keys and associated data.

24. Apparatus for writing data to a memory, the apparatus comprising a processor having an input for receiving a key associated with the data to be written to the memory, wherein the processor:
  generates a key associated with the data to be written to the memory;
  converts the key into a first index value and an associated first signature value;
  converts the key into a second index value and an associated second signature value;
  uses the first and second index values to access a signature table containing a signature value for each entry stored in the memory to which the data is to be written;
  identifies a location in the signature table;
  writes the first or second signature value to the location identified;
  calculates, using the index value associated with the signature value written, an address in a result table of the memory to which the data can be written; and
  writes the data to the address calculated.

25. Apparatus according to claim 24, wherein the processor further removes a signature value stored at the identified location in the signature table and removes an entry in the result table corresponding to the removed signature value if the identified location in the signature table is not vacant.

26. Apparatus according to claim 25, wherein the processor further stores the removed signature value and the removed result table entry in memory.

27. Apparatus according to claim 26, wherein the processor writes the stored signature value to an alternative location in the signature table and writes the stored result table entry to a corresponding alternative address in the result table.

28. Apparatus according to claim 24, wherein the processor further performs a first hash function on the key and performs a second hash function on the key, wherein the second hash function is different from the first hash function.

29. Apparatus according to claim 24, wherein the processor calculates the address in the result table based on the index value associated with the identified signature value and on a position within the signature table of the identified signature value.

30. Apparatus according to claim 24, wherein the signature table is provided in a dual port RAM.

31. Apparatus according to claim 24, wherein the result table is provided in a dual port RAM.

32. Apparatus according to claim 24, wherein the processor operates in a pipelined fashion.

33. Apparatus according to claim 24 further comprising a secondary lookup circuit having a memory for temporary storage of signature table and result table entries.

34. Apparatus according to claim 24 further comprising a parallel circuit having a memory for storing keys and associated data.

35. A field programmable gate array implementing an apparatus according to claim 16.

36. A field programmable gate array implementing an apparatus according to claim 24.

* * * * *